United States Patent [19]

de Vienne

[11] 4,371,172
[45] Feb. 1, 1983

[54] ANCHORING AND SEALING COUPLING FOR A CABLE

[75] Inventor: Robert de Vienne, Paris, France

[73] Assignee: Capri-Codec SA, Colombes, France

[21] Appl. No.: 240,125

[22] Filed: Mar. 3, 1981

[30] Foreign Application Priority Data

Dec. 30, 1980 [FR] France .................. 80 27752

[51] Int. Cl.³ .................. F16J 15/12; F16L 21/04
[52] U.S. Cl. .................. 277/12; 277/4;
  277/121; 277/190; 174/65 SS; 285/343
[58] Field of Search .................. 174/65 SS; 285/161,
  285/339, 343; 277/4, 12, 119–122, 190

[56] References Cited

U.S. PATENT DOCUMENTS

| 2,986,409 | 5/1961 | Weber | 174/65 SS X |
| 3,667,783 | 6/1972 | Sotolongo | 174/65 SS X |
| 4,030,741 | 6/1977 | Fidrych | 174/65 SS X |

FOREIGN PATENT DOCUMENTS

| 1169543 | 5/1964 | Fed. Rep. of Germany ... 174/65 SS |
| 2703611 | 2/1978 | Fed. Rep. of Germany ... 174/65 SS |
| 685003 | 12/1952 | United Kingdom ............ 174/65 SS |

*Primary Examiner*—Robert S. Ward, Jr.
*Attorney, Agent, or Firm*—Holman & Stern

[57] ABSTRACT

A coupling including a tubular main body comprising means for fixing in a wall, and traversed by an axial channel terminating at one end in a conical flared portion. An annular nut screws onto said end of the body surrounding said flared portion. The bottom of the nut is pierced by an axial bore of diameter similar to that of said axial channel. The nut receives internally a sealing ring deformable by tightening, supported on said bottom of the nut to apply on said conical flared portion and to deform by tightening, an annular clip for anchoring said cable extending. The coupling is useful for the fluid-tight fastening of cables through a wall.

10 Claims, 2 Drawing Figures

ANCHORING AND SEALING COUPLING FOR A CABLE

BACKGROUND OF THE INVENTION

1. Field of the Invention

The present invention relates to the sealed passage through a wall of a cable and its fixing to this wall. More particularly it concerns an anchoring and sealing coupling for a cable for its fluid-tight passage through a wall.

2. Description of the Prior Art

This problem is frequently encountered in the electrical components and equipment industry, and more particularly in installations of equipment used by the navy.

Numerous devices are known which are used for this purpose, but these devices are generally relatively complex and do not ensure both the anchoring of the cable and the sealing of the passage, and only accept cables of a predetermined diameter.

It is an object of the present invention to provide a novel anchoring and sealing coupling for a cable which is simple to produce.

It is another object of the invention to provide a novel anchoring and sealing coupling for a cable which is inexpensive to produce.

Another object of the invention is to provide such a coupling which accepts cables of varied diameters.

BRIEF SUMMARY OF THE INVENTION

According to the invention there is provided all anchoring and sealing coupling, characterised in that it comprises a tubular main body including means for fixing in a wall, and traversed by an axial channel terminating at one end in a conical flared portion, with an annular nut threadedly engaged on to the end of the body encircling the flared portion, the bottom of the nut being pierced by an axial bore of a diameter similar to that of the axial channel, the nut receiving internally a sealing ring deformable by tightening supported on the inside of the outer end of the nut to apply on the conical flared portion and deform it by tightening, an annular anchoring clip for said cable.

The bottom of the nut advantageously has a semitoric shape at the periphery of the axial bore, which facilitates compression of the sealing ring and avoids its inadvertent deformations.

This sealing ring may be constituted by a cylindrical washer of thermoplastic or elastomeric material, and the annular clip may have a cylindrical annular base extended by a radially split externally conical portion, forming a clip, of plastically deformable material.

In an advantageous embodiment, the annular base of the annular clip is bounded by an external annular groove separating it from the clip-forming portion, the radial slots extending into the groove.

The sealing ring may have an external diameter slightly greater than that of the annular clip, the sealing ring being supported also in the compressed state on an inner marginal portion of the end of the main body where the conical flare opens, the clip projecting in the free state from the end of the body.

According to one feature of the invention, the sealing ring forms a single part with the anchoring clip, the part being pierced by a cylindrical axial bore and having externally a cylindrical shape, in the part forming the sealing ring, extended by a conical shape in the part constituting the clip, the part being of thermoplastic or elastomeric material gripping at least three flat triangular radial inserts externally mating the conical shape and projecting slightly inside the axial bore.

The portion of the part constituting the sealing ring may have an outer diameter slightly greater than that of the conical flared portion of the bore of the body.

The conical end of the part constituting the clip of such a coupling may advantageously have an outer diameter slightly greater than the inner diameter of the bore of the body.

In a coupling according to the invention, the clip as well as, if necessary, the sealing ring, may be formed of a material of the group comprising plasticized polyvinyl chloride and polyurethane.

When such a coupling is called upon to be used at an ambient temperature of about 20° C., plasticized polyvinyl chloride is entirely suitable. For more severe ambient conditions, it will generally be advantageous to use an overmoldable adapted elastomer with a low coefficient of friction. Polyurethane is not advantageous in contact with aluminum, since it produces an irregular deformation of the sealing portion due to poor sliding, which reduces the tightening capacity by at least 1 mm and a lesser restriction of the anchoring portion is observed.

The invention will be better understood on reading the detailed description which follows with reference to the accompanying drawings which show, by way of non-limiting examples, two embodiments of a coupling according to the invention.

DESCRIPTION OF PREFERRED EMBODIMENTS

Figure 1:
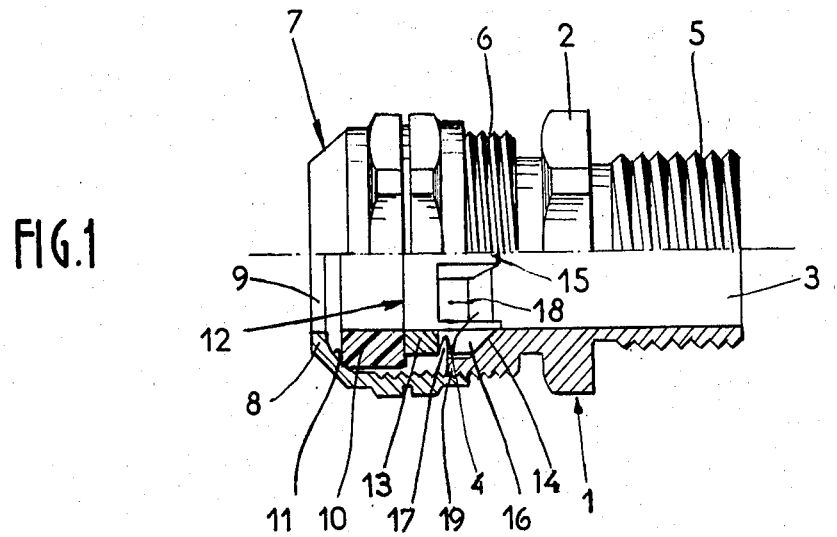
FIG. 1 is a partial cross-sectional view of a first embodiment of a coupling according to the invention, and, FIG. 2 is a view similar to that of FIG. 1, of another embodiment of a coupling according to the invention.

The coupling shown in FIG. 1 comprises a tubular main body 1 having a shoulder 2 in the form of a hexagonal nut in its middle portion.

This main body is traversed by an axial channel 3 which terminates at one end in a conical flared portion 4. The main body 1 is threaded on each side of the shoulder 2. The threading 5 receives a conventional nut which, after insertion of the threaded end 5 into a hole in a wall, enables the coupling to be fastened thereto. The other threading 6 of the body 1, which surrounds the conical flare 4, receives an annular nut 7 whose outer end 8 is pierced by an axial bore 9 of diameter similar to that of the axial channel 3. This nut 7 receives internally a sealing ring 10 which comes into abutment against a semitoric portion 11 surrounding the axial bore 9. The coupling also comprises an annular clip 12.

This clip 12 has a cylindrical annular ring or base 13 extended from an outwardly conical portion 14, slotted radially and forming a 6-armed clip, such as 15, 16. An outer annular groove 17 separates the clip-forming part from the annular base 13. The radial slots 18 are extended into this groove 17, which ensures greater flexibility of the arms 15, 16.

The sealing ring 10 has an outer diameter slightly greater than that of the clip 12, which enables it to be supported in the compressed condition on the inner marginal portion 19 of the end of the body 1 where the conical flare 4 opens out.

In the free condition, the clip 12 projects from the body 1 when its arms 15, 16 are supported against the conical portion 4. Thus when the nut 7 is screwed onto the body 1, the ring 10 is compressed and is clamped on the cable (not shown) due to its contact with the semi-toric portion 11 of the inner part of the outer end of the nut 7, and which repels the clamp 12 to the inside of the body 1 causing gripping of the conical portion 14 of the arms 15, 16 of the clamp in contact with the conical flare 4, which ensures the anchoring of the cable in the coupling.

Figure 2:
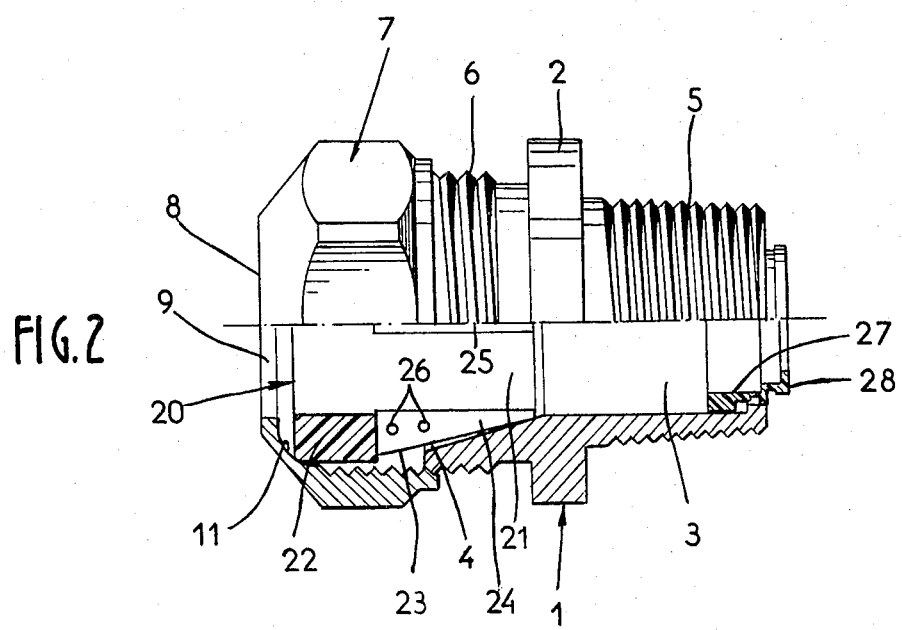

In the embodiment shown in FIG. 2, the main body 1 also has a shoulder 2 in the form of a hexagonal nut, encircled on one side by a threading 5, which permits its fastening in a bore of a wall to be traversed by the cable, and on the other side by a threading 6 on which a nut 7 is screwed.

The semi-toric portion 11 of the bottom 8 of the nut surrounding the axial bore 9 is also again to be seen.

This embodiment differs from that of FIG. 1 in that the sealing ring forms a single part 20 with the anchoring clip. This part is pierced by a cylindrical axial bore 21 and has externally a cylindrical shape 22 in the portion constituting the sealing ring which is extended by a conical shape 23 in the portion constituting the clip. This part 22 is of an elastomeric material which grips four metallic inserts such as 24, 25, radially positioned, of flat triangular cross-sectional shape which mate the conical form 23 outwardly and project slightly into the axial bore 21.

These inserts 24, 25 have holes, such as 26, into which the plastics material penetrates during the molding of the part 20. This ensures the holding of the inserts 24 in position in the coupling.

In the embodiment shown the FIG. 2, the coupling also includes, at the end of its inside bore 3, a ferrule 27 of plastics material having at least one step 28. This prevents the penetration of the sheath of the cables of various sizes into the apparatus on to which said coupling is mounted.

When the nut 7 is screwed onto the threading 6, the semi-toric portion 11 drives back the cylindrical portion 22 forming the sealing ring of the part 20 and causes the regripping of the conical portion 23 forming a clip, against the conical flare of the body 1. The inserts 24, 25 are clamped against the cable (not shown) thereby ensuring its anchoring, whilst the portion 22 driven inwardly ensures the sealing action.

The end of the conical portion 23 of the part 20 remote from elastomeric part 22 has a slightly greater outer diameter than the inner diameter of the bore 3 of the body 1, which ensures a larger clamping margin and better anchoring resulting from a slight tilting of the inserts, 25 in the direction of the axis.

The latter embodiment with the polyurethane part 20 ensures sealing and anchoring on cables of about 18 to 14 mm diameter. The tear-off strength with a cable of about 13 mm5 diameter on the sheath is 18 kg. This value is greater than 50 kg for a cable of outer diameter of 15 mm on the sheath.

With a part 22 formed of plasticized polyvinyl chloride, the coupling according to the invention ensures the sealing and anchoring of the cables of about 17.5 to 12.5 mm. The tear-off strength exceeds 50 kg with a cable of 13.5 mm diameter on the sheath.

With a cable surrounded by a metal sheath and a body 1, also of metal, the part 20 ensures three functions simultaneously: the sealing of the passage, anchoring of the cable, and the grounding of the sheath of the cable.

Of course, the invention is in no way limited to the embodiments described and illustrated since it is capable of numerous modifications which can occur to the technician skilled in the art according to the uses contemplated and without departing however from the scope of the invention.

I claim:

1. An anchoring and sealing coupling for a cable comprising a tubular main body, means on said body for fixing said body to a wall, an axial channel extending through said body terminated at one end by a conical flared portion, an annular nut threadedly engaging on to said one end of the body encircling said conical flared portion, the outer end of said nut having an axial bore therethrough of diameter similar to the diameter of said axial channel, a deformable sealing ring within the interior of said nut and supported thereby adjacent said outer end, said sealing ring comprising a cylindrical washer of thermoplastic or elastomeric material, an annular clip between said sealing ring and said conical flared portion for anchoring a cable extending through said tubular body and nut, said annular clip comprising a cylindrical annular base having an externally conically shaped radially slotted portion extending therefrom of plastically deformable material, and an external annular groove at the juncture of said base and slotted portion, the radial slots extending into said groove, whereby tightening of said nut deforms said sealing ring causing the sealing ring to move said conically shaped slotted portion of said clip against said conical flared portion of said main body to force said radially slotted portion radially inwardly into engagement with the cable.

2. An anchoring and sealing coupling for a cable, comprising a tubular mainbody, attachment means on said body for fixing said body to a wall, an axial channel extending through said body terminated at one end by a conical flared portion, an annular nut threadedly engaging said end of the body encircling said flared portion, an axial bore through the outer end of said nut of diameter similar to the diameter of said axial channel, a resilient cylindrical sealing ring within said nut and supported thereby adjacent said outer end, a deformable annular clip between said sealing ring and said conical flared portion of said tubular main body in cooperative relationship for anchoring a cable extending through said tubular body and nut, whereby tightening said nut axially compresses said resilient sealing ring causing said sealing ring to expand into tight sealing engagement with the cable and to force said clip against said conical flared portion deforming said clip into anchoring engagement with the cable.

3. A coupling according to claim 2, wherein the inner side of said outer end of the nut has a semi-toric shape at the periphery of the axial bore.

4. A coupling according to claim 2, wherein said sealing ring comprises a cylindrical washer of thermoplastic or elastomeric material, and said annular clip comprises a cylindrical annular base and an externally conically shaped radially slotted portion extending therefrom toward said conically flared portion forming a clip of plastically deformable material.

5. A coupling according to claim 4, wherein said sealing ring has an outer diameter slightly greater than that of said annular clip, whereby said sealing ring is supported in the compressed state on a marginal portion at the end of the main body where the conical flared portion opens, said clip projecting in the free state from said end of said main body.

6. Coupling according to claim 2, wherein the sealing ring forms a single part with the anchoring clip, said part being pierced by a cylindrical axial bore having externally a cylindrical shape in the portion constituting the sealing ring, extending through a conical shape into the portion constituting the part, said part being of a thermoplastic or elastomeric material gripping at least three flat triangular radial metallic inserts externally mating with said conical shape and projecting slightly inside said axial bore.

7. Coupling according to claim 6, wherein the portion of the part constituting the sealing ring has an outer diameter slightly greater than that of the conical flare of the bore of the body.

8. Coupling according to claim 6, wherein the conical end of the part constituting the clip has an outer diameter slightly greater than the inner diameter of the bore of the body.

9. Coupling according to claim 2, wherein the clip is of a material of the group comprising plasticized polyvinyl chloride and polyurethane.

10. Coupling according to claim 2, wherein the sealing ring is of a material of the group comprising plasticized polyvinyl chloride and polyurethane.

* * * * *